Figure 1:
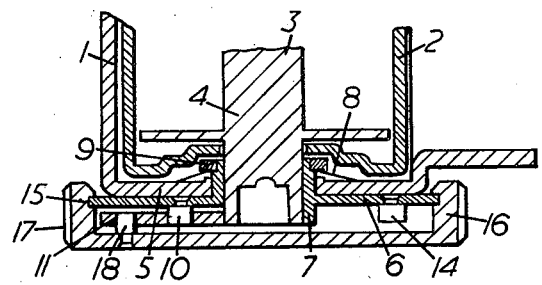

Dec. 15, 1964   H. STREHLE ETAL   3,161,369
RE-WINDING DEVICE FOR PHOTOGRAPHIC CAMERAS
Filed May 12, 1961   2 Sheets-Sheet 1

Inventors
HORST STREHLE
HERBERT WELZEL
By Irwin S. Thompson
Attorney

Dec. 15, 1964  H. STREHLE ETAL  3,161,369
RE-WINDING DEVICE FOR PHOTOGRAPHIC CAMERAS
Filed May 12, 1961  2 Sheets-Sheet 2
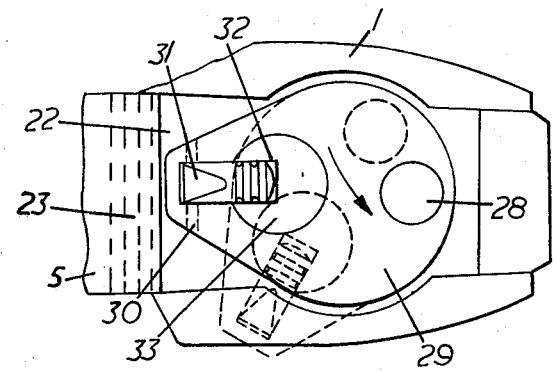
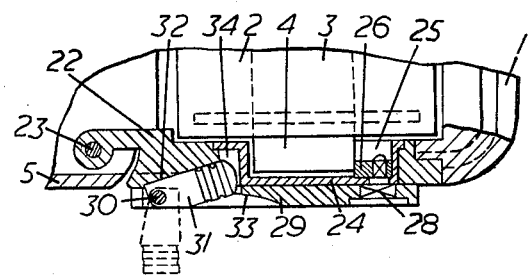
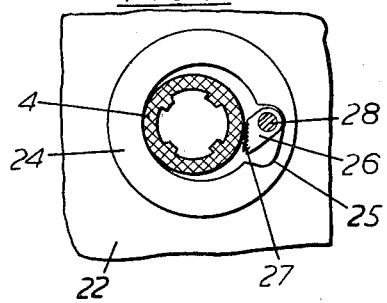
*Inventors*
HORST STREHLE
HERBERT WELZEL
By *Irwin S. Thompson*
Attorney United States Patent Office 3,161,369
Patented Dec. 15, 1964

3,161,369
RE-WINDING DEVICE FOR PHOTOGRAPHIC
CAMERAS
Horst Strehle and Herbert Welzel, Dresden, Germany, assignors to VEB Kamera- und Kinowerke Dresden, Dresden, Germany
Filed May 12, 1961, Ser. No. 109,748
4 Claims. (Cl. 242—71.6)

The invention relates to a re-winding arrangement for photographic cameras, especially for standard film spools with or without cassette, by which the film, after exposure has taken place picture by picture, can be wound back from the film take-up spool onto the film supply spool again.

An object of the invention is to substantially reduce the overall height of the re-wind mechanism compared with those known.

The re-winding arrangement proposed in accordance with the invention is preferably rotatably mounted co-axially with the film spool in the bottom of the camera and possesses a clamping clutch controllable by its handle, which co-operates effectively with the film spool neck during re-winding. According to a form of embodiment in accordance with the invention a clutch ratchet lever, arranged on a mounting disc subject to friction, possesses a cam slot in which an operating pin secured on the re-wind knob engages in such fashion that in the re-winding the ratchet lever is pressed against the film spool neck and thereby entrains the film spool, a guide provided in the mounting disc for the film spool neck serving as counter-abutment. In a further development of the invention the clamping clutch can also be constructed after the fashion of an eccentric, with which there is connected a re-wind crank.

According to these embodiments on the one hand in the re-winding, the clamping clutch in each case becomes effective and the film is thereby entrained, and on the other hand in the case of the opposite direction of rotation of the re-wind handle the clamping clutch comes out of action. Thus the object is achieved that in the winding of the film picture by picture, wherein the film supply spool rotates contrarily to the re-winding arrangement, the re-winding arrangement is always uncoupled from the film spool. Here it further appears that in accordance with the invention the film spool neck is used for the re-winding, an appropriate reduction of structural height and the advantage that the film spool drive arranged on the other side of the film spool can be arranged in fully sunk fashion in the camera housing or covered thereby are obtained.

Further features of the invention appear from the two examples of embodiment as explained in the following description and illustrated in the drawings. Here representation has been omitted of all details which do not appear absolutely necessary for the understanding of the invention.

Figure 2:
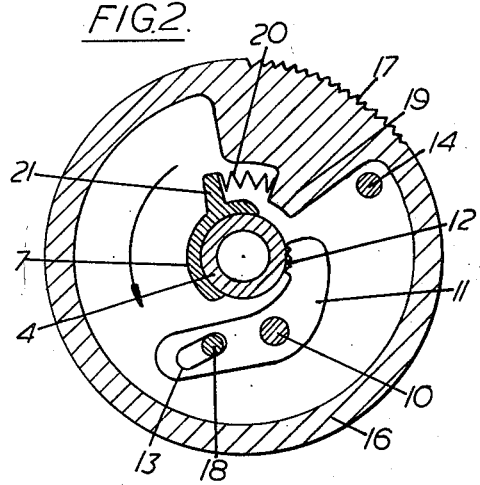

FIGURES 1 and 2 show an example of embodiment of a re-winding arrangement according to the invention provided on the bottom of a camera, the re-winding handle being constructed as re-winding knob. Here FIGURE 1 shows a lateral elevation in section and FIGURE 2 a cross-section through the re-winding knob.

FIGURES 3, 4 and 5 show an example of embodiment of a re-winding arrangement in accordance with the invention arranged on the bottom of a camera, with a clamping clutch, and a crank connected with the clamping clutch serving as re-winding handle. Here FIGURE 3 shows the re-winding arrangement, seen towards the bottom of the camera, and FIGURE 4 shows a lateral elevation of this re-winding arrangement, partly in section. FIGURE 5 shows as detail a cross-section through the film spool neck with the arrangement of a clamping clutch constructed as eccentric, in the effective position.

In the examples of embodiment according to FIGURES 1 and 2, in the illustrated broken-away part of the camera housing 1 in the space provided for this purpose there is situated the cassette 2 with the film spool 3 mounted therein, the spool neck 4 of which passes through the cassette 2 downwards through the camera bottom 5. The film spool 3 works as film supply spool and the exposed film is wound back on to this spool. Co-axially with the film spool 3 there is provided on the camera bottom 5 a mounting disc 6, which is rotatably mounted by means of a bush 7 in the camera bottom 5 and subject to the action of a friction spring 8, which bears on the one hand against the camera bottom 5 and on the other hand against a collar 9, which is firmly connected with the bush 7 of the mounting disc 6. As a result of this arrangement, due to the action of the friction spring 8, the mounting disc 6 is pressed against the external surface of the camera bottom 5. On the mounting disc 6 there is secured a pivot pin 10 for a clutch ratchet lever 11 of two-armed construction. This lever is provided on one arm with gripping teeth 12 directed towards the film spool neck 4 and its other arm possesses a cam slot 13. Furthermore a stop pin 14 is also secured on the mounting disc 6.

The mounting disc 6 is grasped round its periphery 15 by a rotary knob 16 serving as re-winding handle and held in rotatable fashion by the mounting disc 6. The rotary knob 16 is provided on its periphery in a manner known per se with milling 17 and is made hollow, so that the clutch ratchet lever 11 can move in its internal space. On the inner side of the rotary knob 16 there is secured an operating pin 18, which engages in the cam slot 13 of the clutch ratchet lever 11. The rotary knob 16 is also provided with a stop 19 directed towards its centre, against which a compression spring 20 presses, which is held on the other side by a part 21 of the mounting bush 7 extending into the internal space of the rotary knob 16. The mounting part 21 only partly surrounds the film spool neck 4, as shown in FIGURE 2, so that the clutch ratchet lever 11 can co-operate without hindrance with the neck 4.

The manner of operation of the re-winding arrangement according to FIGURES 1 and 2 as explained is as follows:

For the purpose of re-winding the rotary knob 16 is to be rotated in the direction of the arrow as illustrated in FIGURE 2. The operating pin 18 secured on the rotary knob 16, and engaging in the cam slot 13 of the clutch ratchet lever 11, presses the latter with its gripping teeth 12 against the film spool neck 4 and thereby entrains the film spool 3 in the direction of rotation of the rotary knob 16. On the one hand the bush 7 of the mounting disc 6 grasps round the film spool neck 4 and on the other hand the latter is pressed by the clutch ratchet lever 11 against the bearing surface of the bush 7, the force of the clamping action being increased by the mounting disc 6 connected with the clutch ratchet lever 11, according to the force of the friction spring 8 acting upon the disc 6. Thus a reliable entraining of the film spool 3 in re-winding is ensured. As soon as the re-winding operation is terminated, or the rotary knob 16 is no longer actuated, the latter is moved back by the action of the compression spring 20 contrarily of the direction of the illustrated arrow until its stop 19 strikes against the stop pin 14. In this return movement the operating pin 18 secured on the rotary knob 16 at the same time brings the clutch ratchet lever 11 out of action with the film spool neck 4 and thus the re-winding arrangement is uncoupled from the film spool 3.

In the case of the re-winding arrangement as illustrated according to the example of embodiment as shown in FIGURES 3 to 5 the parts which conform with the parts of the explained example of embodiment according to FIGURES 1 and 2 are designated by the same reference numerals.

In the cassette 2, here inserted in the camera housing 1, there is situated the film spool 3, indicated in chain lines, which extends with its spool neck 4 downwards out of the cassette 2. On the camera bottom 5 in the region of the cassette 2 there is provided a bottom part 22 which can be opened and closed by hinge movement, and is pivotable about the bearing 23 arranged on the camera side. In the bottom part 22 there is mounted the clamping clutch, which possesses a mounting disc 24 rotatable in the bottom part 22, with a recess 25, in the region of which there is arranged a clutch ratchet lever 26 constructed after the style of an eccentric, with gripping teeth 27 directed towards the film spool neck 4. The clutch ratchet lever 26, which is pivotably mounted in the rotatable mounting disc 24 by means of a pivot pin 28, is secured thereby to a crank arm 29 provided beneath the bottom part 22. The crank arm possesses a crank handle 31 hingeable about the hinge pin 30, which handle can be hinged into a groove 32 of the crank arm 29 in the inoperative position and hinged out of this groove into the position for use, as illustrated in chain lines in FIGURE 4. Here a troughlike depression 33 provided on the crank arm 29 facilitates the hinging out of the crank handle 30.

The manner of operation of the re-winding arrangement according to FIGURES 3, 4 and 5 is as follows:

For the actuation of the re-winding arrangement the crank handle 31, which lies counter sunk in the crank arm 29, is to be hinged out so that as shown in chain lines in FIGURE 4 it is at right angles to the crank arm 29. In the following re-winding the crank arm 29 presses the clutch ratchet lever 26 therewith connected by the pin 28, with its gripping teeth 27 against the film spool neck 4, as shown in FIGURE 5, and the film spool 3 is thereby entrained in the direction of rotation of the crank 29, 31. By reverse rotation of the crank 29, 31 the clutch ratchet lever 26 comes out of action with the film spool neck 4 and thus the film spool 3 is again uncoupled from the re-winding arrangement. In this position, by hinging over of the crank handle 31 into the groove 32 provided on the crank arm 29, which conforms with a further groove 34 provided in the camera housing 1, at the same time the crank movement and thus the re-winding arrangement are arrested.

The invention is not to be limited to the two examples of embodiment as explained and illustrated. For example, the re-winding arrangement can possess, apart from one single clamping clutch acting upon the film spool neck, also a plurality of ratchet levers, for example two or three, which engage at two or three positions on the film spool neck and are controlled commonly by an appropriate number of operating pins of the rotary knob. In the same way, the clamping clutch constructed after the fashion of an eccentric and actuated by a crank can possess a plurality of clutch ratchet levers, which are for example connected with one another by a common ring. According to all these possible embodiments, in the rewinding the film spool is reliably entrained and equally in the reverse movement of the re-winding handle is immediately and reliably uncoupled. Here the further advantage is also obtained that the rewinding arrangement in accordance with the invention still works reliably in the case of moderate differences of the diameter of the film spool neck.

We claim:

1. In a photographic camera having a casing containing mounting means for a film supply spool formed with a neck portion, and take-up means for drawing film off the film supply spool during wind-on, the provision of re-winding means adapted to re-wind film back onto the film supply spool, said re-winding means comprising a collar, having a disc portion formed integrally therewith, rotatably mounted on the casing and adapted to receive and support the neck portion of the film supply spool, a first spring means arranged between said collar and the casing to urge said disc into frictional engagement with said casing, at least one clutch lever pivotally mounted on the disc portion of the collar on an axis displaced from the central axis of the collar and engageable with said neck portion to drive the latter in one direction only, a drive member rotatably mounted on said disc portion, a drive pin extending from said drive member and engaging a slot in said clutch lever to rotate the latter into frictional engagement with the film spool neck on initial movement of said drive member in one direction so as to press said neck portion against said collar, and a second spring means arranged between said drive member and said collar to effect relative movement between said collar and drive member when the latter is released to cause disengagement of said lever from said spool neck, said lever effecting rotation of said film supply spool on continued rotation of said drive member in said one direction thereof, said supply spool being normally free to rotate for film wind-on when the re-winding means is not in use.

2. In a photographic camera having a casing containing mounting means for a film supply spool formed with a neck, and take-up means for drawing film off the film supply spool during film wind-on, the provision of rewinding means adapted to rewind film back onto the film supply spool, said rewinding means comprising a collar having a portion adapted to receive and support the neck of the film supply spool, means rotatably mounting the collar on the casing, at least one clutch lever pivotally mounted on the collar on an axis displaced from the central axis of the collar and positioned adjacent the film spool neck so as to be engageable therewith on a side of said neck opposite said portion of said collar and arranged to drive said neck in one direction only, a drive member rotatably mounted on the casing for initial rotation relative to and coaxially of said collar, and lost motion means operatively connecting said drive member to said clutch lever first to rotate the latter into frictional engagement with the film spool neck on movement of said drive member in one direction to press said neck against the inside of said collar and subsequently to rotate said film supply spool on continued rotation of said drive member, the frictional engagement of the clutch lever with said neck being effective only on movement of said drive member in said one direction thereof, said supply spool being normally free to rotate for film wind-on when the rewinding means is not in use.

3. In a photographic camera having a casing containing mounting means for a film supply spool formed with a neck, and take-up means for drawing film off the film supply spool during wind-on, the provision of rewinding means adapted to rewind film back onto the film supply spool, said rewinding means comprising a collar having a portion adapted to receive and support the neck of the film supply spool, the collar having a disc portion in unitary assembly therewith, means mounting the collar and the disc portion for rotation on the casing, spring means arranged between said collar and the casing to urge said disc portion into frictional engagement with said casing, at least one clutch lever pivotally mounted on the disc portion of the collar on an axis displaced from the central axis of the collar and engageable with said neck on a side of said neck opposite said portion of said collar to drive said neck in one direction only, a drive member mounted for initial rotation on and relative to and coaxially of said disc portion, and lost motion means operatively connecting said drive member to said clutch lever first to rotate the latter into frictional engagement with the film spool neck on movement of said drive member in one direction to press said neck against the inside of said collar and subsequently to rotate said film supply spool on continued rotation of said drive member in said one direction thereof, said supply spool being normally free to rotate for film wind-on when the rewinding means is not in use.

4. In a photographic camera having a casing containing mounting means for a film supply spool formed with a neck, and take-up means for drawing film off the film supply spool during wind-on, the provision of rewinding means adapted to rewind film back onto the film supply spool, said rewinding means comprising a collar having a portion adapted to receive and support the neck of the film supply spool, the collar having a disc portion in unitary assembly therewith, means mounting the collar and the disc portion for rotation on the casing, spring means arranged between said collar and the casing to urge said disc portion into frictional engagement with said casing, at least one clutch lever pivotally mounted on the disc portion of the collar on an axis displaced from the central axis of the collar and engageable with said neck on a side of said neck opposite said portion of said collar to drive said neck in one direction only, a drive member mounted for initial rotation on and relative to and coaxially of said disc portion, and lost motion means including a drive pin extending from said drive member and engaging a slot in said clutch lever first to rotate the latter into frictional engagement with the film spool neck on movement of said drive member in one direction to press said neck against the inside of said collar, said lever thereafter effecting rotation of said film supply spool on continued rotation of said drive member in said one direction thereof, said supply spool being normally free to rotate for film wind-on when the rewinding means is not in use.

References Cited in the file of this patent

UNITED STATES PATENTS

| | | |
|---|---|---|
| 2,150,696 | Nelson | Mar. 14, 1939 |
| 2,229,283 | Fischer | Jan. 21, 1941 |
| 2,639,100 | Wehrenfennig et al. | May 19, 1953 |
| 2,830,776 | Polhemus | Apr. 15, 1958 |
| 2,984,166 | Van den Broek | May 16, 1961 |
| 3,005,599 | Padelt | Oct. 24, 1961 |